United States Patent [19]

Bancroft

[11] Patent Number: 5,776,386
[45] Date of Patent: Jul. 7, 1998

[54] SCRAP-BASED METHOD OF MOLDING PLASTIC ARTICLES

[75] Inventor: Patrick A. Bancroft, Rockwall, Tex.

[73] Assignee: United States Brass Corporation, Dallas, Tex.

[21] Appl. No.: 777,956

[22] Filed: Dec. 24, 1996

[51] Int. Cl.⁶ .................................................. B29C 67/00
[52] U.S. Cl. ................ 264/37; 264/331.11; 264/DIG. 69
[58] Field of Search ............................ 264/37, DIG. 69, 264/331.11, 176.1, 328.1

[56] References Cited

U.S. PATENT DOCUMENTS

| 3,923,947 | 12/1975 | Cook | 264/141 |
|---|---|---|---|
| 4,117,195 | 9/1978 | Swarbrick et al. | 428/379 |
| 4,264,661 | 4/1981 | Brandolf | 428/36 |
| 4,333,898 | 6/1982 | Schmidtchen | 264/45.9 |
| 5,407,624 | 4/1995 | Engh, III et al. | 264/141 |
| 5,505,900 | 4/1996 | Suwanda et al. | 264/477 |
| 5,605,660 | 2/1997 | Buongiorno et al. | 264/456 |

OTHER PUBLICATIONS

"Methods and Benefits of Crosslinking Polyolefins For Industrial Applications". 1996, AEI Compounds.
"Advances in Silane Crosslinking of Polyethylene". Undated, Union Carbide.
"Polymer Crosslinking With Union Carbide Organofunctional Silane A-171". 1992, Union Carbide, pp. 1-4.
"Standard Specification For Polyethylene (PEX) Tubing" 1993, ASTM, pp. 942-946.
"Standard Specification For Crosslinked Polyethylene (PEX) Plastic Hot-And Cold-Water Distribution Systems", 1993, ASTM, pp. 947-951.

Primary Examiner—Mary Lynn Theisen
Attorney, Agent, or Firm—Catherine E. Bracken; J. Richard Konneker; Marlin R. Smith

[57] ABSTRACT

A molded cross-linked polyethylene article is formed using cross-linked polyethylene scrap generated in a previous extrusion process. The scrap is used, either by itself or mixed with essentially virgin cross-linkable polyethylene and a master batch mixture, to define a partially cross-linked moldable plastic material having a gel percent higher than that of the essentially virgin polyethylene used in the extrusion process. The mold used to form the scrap-based polyethylene end product has, for the essentially virgin polyethylene, a maximum acceptable plastic inflow rate. However, when the same mold is used to form the scrap-based polyethylene article, the molding problems previously associated with attempts to use polyethylene scrap in a heat-based cross-linked plastic formation process are advantageously eliminated by reducing the plastic mold inflow rate to a rate not greater than a second inflow rate less than the maximum virgin polyethylene flow rate and inversely related to the ratio of the gel percent of the scrap-based polyethylene used in the molding process to the gel percentage of the essentially virgin polyethylene.

15 Claims, 1 Drawing Sheet

SCRAP-BASED METHOD OF MOLDING PLASTIC ARTICLES

BACKGROUND OF THE INVENTION

The present invention generally relates to the heat-based formation of plastic articles, such as by molding and extrusion processes, and, in a preferred embodiment thereof, more particularly relates to a specially designed method for molding plastic articles at least partially utilizing cross-linked polyethylene scrap generated in a previous heat-based plastic forming process.

As is well known in the manufacturing arts, the heat-based formation of plastic articles, such as by molding and extrusion processes, tends to be a fiercely competitive high volume, low profit margin commercial endeavor. Even a seemingly minuscule cost savings per generated plastic part, when multiplied by thousands of parts results in a welcome increase in total profit for a manufacturer or permits him to at least slightly lower his selling price to more effectively compete with other manufacturers of similar plastic products.

In the typical large scale heat-based production of plastic articles a considerable amount of plastic scrap tends to be generated, and the potential economic benefits of recycling the scrap plastic for use in subsequently fabricated plastic products have been well known for many years. Many molded or extruded plastic products have, in fact, been fabricated using plastic stock at least partially defined by previously generated plastic scrap. Adding to the overall fabricational economy in these previous scrap-based plastic forming techniques has been the ability to use the same molds or extruders with which nonscrap-based formation processes were carried out.

A notable and long-known exception to this scrap-based formation of molded or extruded plastic articles is when the plastic material utilized is a cross-linkable plastic material such as polyethylene. Heretofore it has simply not been practical to utilize previously generated cross-linked polyethylene scrap in any substantial concentrations to subsequently heat-form additional plastic articles without at least the very substantial difficulties and expense of substantially altering the heat-forming apparatus (such as the mold or the extruder) used to form non-scrap articles (i.e., those formed from essentially virgin polyethylene), or using an entirely different heat-forming apparatus.

From the foregoing it can readily be seen that it would be highly desirable to provide a scrap-based method of heat forming an article from a cross-linkable plastic such as polyethylene using the same heat forming apparatus used to form the article with the cross-linkable plastic in its essentially virgin form. It is accordingly an object of the present invention to provide such a method.

SUMMARY OF THE INVENTION

In carrying out principles of the present invention, in accordance with a preferred embodiment thereof, a unique method is provided for heat-forming a cross-linked plastic article, for example by a molding or extrusion process, utilizing at least in part a quantity of cross-linked plastic scrap representatively generated in a previous plastic heat-forming process.

From a broad perspective, the method is carried out by utilizing a quantity of scrap-containing plastic material, comprising at least in part a quantity of the cross-linked plastic scrap, having a gel percent greater that the gel percent of essentially virgin cross-linkable plastic material of the type from which the scrap was formed. A plastic article forming apparatus into which plastic may be forcibly flowed is provided. The plastic article forming apparatus, which may representatively be a mold or extruder structure, has a first maximum acceptable plastic volumetric inflow rate when it is used with the essentially virgin cross-linkable plastic material.

To form the cross-linked plastic article a quantity of the scrap-containing plastic material is flowed into the plastic article forming apparatus (for example, a mold) at a volumetric inflow rate not greater than a second plastic volumetric inflow rate less than the first maximum acceptable plastic volumetric inflow rate and inversely related to the ratio of the gel percent of the scrap-containing plastic material to the gel percent of the essentially virgin cross-linkable plastic material.

In this manner the same plastic heat-forming apparatus, representatively a mold, may be used to form cross-linked plastic products from an essentially virgin cross-linkable stock material as well as a substantially cross-linked scrap-based plastic stock material. The process may be used with a scrap-containing plastic material flowed into the mold and defined by (1) a quantity of the cross-linked plastic scrap material by itself, or (2) a mixture comprising a quantity of essentially virgin cross-linkable plastic material and a quantity of cross-linked plastic scrap.

DETAILED DESCRIPTION

Figure 1A:
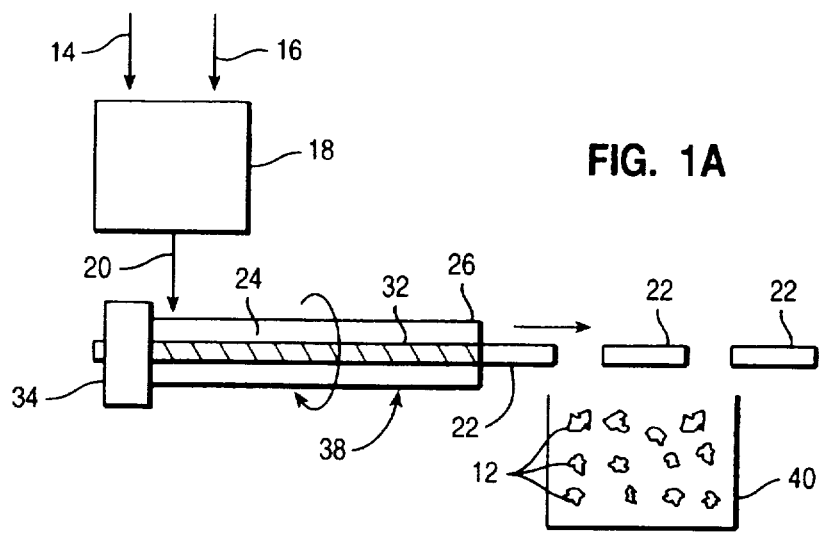
FIGS. 1A–1C are highly schematic diagrams sequentially illustrating steps used in a cross-linked polyethylene molding process using scrap from a previous polyethylene forming process and embodying principles of the present invention.
Figure 1B:
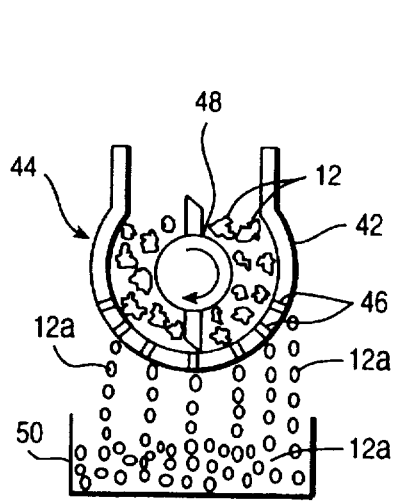
Figure 1C:
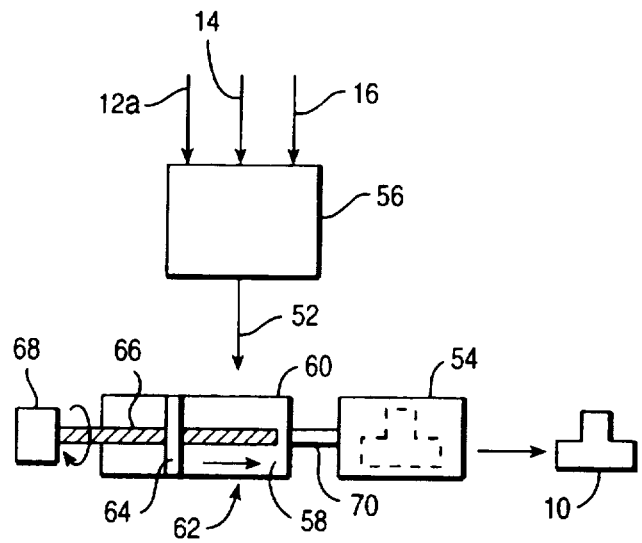

Schematically depicted in FIGS. 1A–1C is a novel method of forming a cross-linked plastic article 10 (see FIG. 1C), illustratively a piping tee fitting, which embodies principles of the present invention and utilizes cross-linkable plastic scrap 12 (see FIG. 1A) generated in a prior plastic forming process. Turning now to FIG. 1A, the process in which the scrap 12 is generated is a heat-based plastic forming process, and is representatively an extrusion process. Alternatively, the process could be another form of heat-based plastic forming such as a molding process.

In the illustrative extrusion process, in a known manner a quantity of cross-linkable plastic material 14, representatively a silane-grafted polyethylene material in an essentially virgin state, is suitably deposited with a quantity 16 of a conventional "master batch" into a mixing hopper 18 to form a mixed plastic material 20 used in the extrusion process to form plastic objects 20, representatively lengths of plastic pipe 22. As is well known in the plastic forming art, the "master batch" 16 is a suitable mixture of catalysts, antioxidants and other additives which facilitate the cross-linking of the polyethylene 14. As used herein with respect to a cross-linkable plastic material, the term "essentially virgin" means that such material has a gel percent (i.e., the percentage of actual cross-linking of the polyethylene) of not greater than about ten percent. The silane-grafted polyethylene 14, as received from the manufacturer, is in an essentially virgin state. When "fully" cross-linked, silane-grafted polyethylene 14 has a gel percent generally above 65 percent.

Still referring to FIG. 1A, the plastic material 20 is flowed into a chamber 24 disposed within the housing portion 26 of an extrusion machine 38. A screw 32 within the housing 26 is rotationally driven by a variable speed motor 34 to melt and force the plastic material 20 rightwardly through the extruder 38. Operative passage of the plastic material 20 through the extruder 38 outputs therefrom the illustrated molded plastic articles 22 and simultaneously generates the plastic scrap 12 which is collected in a suitable container 40.

Due to heat added to the plastic material 20 in the extruder 38, both the plastic scrap 12 and fabricated plastic objects 22 are partially cross-linked when they exit the extruder 38. The plastic objects 22 are subjected to a steam or hot water heat treatment to fully cross-link them, and the cross-linking in the collected plastic scrap begins to slowly increase due to the moisture in the ambient air surrounding it.

Turning now to FIG. 1B, the collected scrap 12, either contemporaneously with the extrusion process or subsequently thereto, is placed in the drum portion 42 of a conventional plastic granulator 44. Drum portion 42 has holes 46 formed in its bottom side which are substantially smaller (representatively in the range of from about ¼" to about ⁵⁄₁₆" in diameter) than the pieces of plastic scrap 12. A rotating, bladed granulator structure 48 within the drum 42 forces the plastic scrap 12 through the holes 46 to form smaller granular plastic scrap 12a which is collected in a suitable container 50.

As will now be described in conjunction with FIG. 1C, the granulated, partially cross-linked plastic scrap 12a is next used, either by itself or with a quantity of essentially virgin cross-linkable polyethylene 14 and a quantity of master batch 16, to form a mixed cross-linked plastic material 52 which is used in conjunction with a mold 54 to form the fabricated plastic articles 10 and has a gel percent higher than that of the essentially virgin cross-linkable polyethylene 14.

Using a mixing hopper 56, the cross-linked plastic material 52 may be formed in three ways. First, in the case of silane-grafted polyethylene, if the scrap 12 was generated approximately eight days or less before the molding process is to be carried out the granulated scrap 12a is placed in the mixing hopper 56 by itself—i.e., without the quantities of essentially virgin cross-linkable polyethylene 14 and master batch 16. In this case, the plastic material 52 consists entirely of granulated plastic scrap 12a.

Second, the granulated plastic scrap 12a may be added to the mixing hopper 56 with the quantities of essentially virgin polyethylene 14 and master batch 16 so that the plastic material 52 discharged from the mixing hopper 56 is a mixed blend of plastic scrap 12a, essentially virgin polyethylene 14, and master batch 16.

Third, of course, the quantities of essentially virgin polyethylene 14 and master batch 16 may be placed in the mixing hopper 56 without the scrap 12a and then discharged from the mixing hopper 56.

The plastic material 52 (in whichever one of its three potential forms is selected for use in the molding process) is flowed into a chamber 58 disposed within the housing portion 60 of a molding press 62 to the right of a piston 64 slidably disposed within the housing 60. A screw 66 is operatively coupled to the piston 64 and is rotationally driven by a variable speed motor 68 to move the piston 64 leftwardly through the chamber 58, and heat is added to the plastic material 52 within the housing 60 in a conventional manner to melt the plastic material therein. The piston 64 is then driven rightwardly through the chamber 58 forcing the melted plastic material 52 rightwardly through an inlet passage 70, at a volumetric flow rate selectively variable by appropriately adjusting the speed of the motor 68, into the interior of the mold 54 in which the fabricated plastic article 10 is formed.

For the representatively illustrated mold 54 the maximum acceptable plastic inflow rate using the essentially virgin plastic mixture 14,16 (having a gel percent of approximately 10 percent) is 17.3 cubic inches per second. At higher plastic inflow rates (and thus higher inflow pressures) molding problems, such as "short-shooting" (i.e., blocking the plastic inflow) and mold "flashing" (i.e., blowing the mold open), begin to occur.

Figure 2:
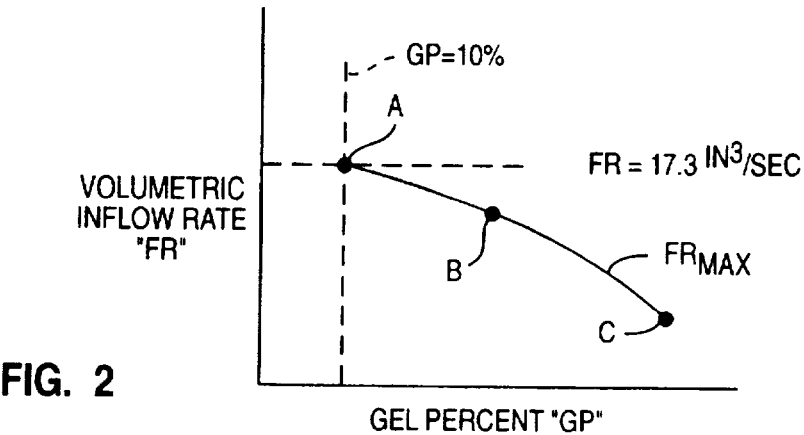
FIG. 2 is a graph depicting a unique relationship between the cross-linked polyethylene inflow rate to the mold shown in FIG. 1C and the gel percent of the inflowing polyethylene.

With reference now to the graph in FIG. 2, according to a key aspect of the present invention a scrap-based partially cross-linked plastic material 52 is used with the same mold 54 (i.e., the scrap 12a or the mixture of scrap 12a, virgin polyethylene 14 and master batch 16) to economically form the plastic articles 10 without the molding difficulties, or the need to use a specially designed different mold, uniformly encountered in prior art attempts to use recycle previously generated cross-linked plastic scrap in the heat-based formation of new plastic products.

In sharp contrast to conventional molding design wisdom that unsuccessfully predicated the molding of scrap-based cross-linked plastic materials on increasing mold inflow rates and pressures as the gel percent of the scrap-based cross-linked plastic material increased beyond its essentially virgin level, the method of the present invention successfully takes a decidedly opposite approach. Generally speaking, as graphically depicted in simplified form in FIG. 2, the heat-based plastic formation method of the present invention maintains an inverse relationship between the gel percent "GP" of the plastic material 52 being supplied to the mold 54 and the plastic volumetric inflow rate "FR" into the mold 54. In other words, instead of attempting to flow a higher-than-virgin gel percent cross-linked plastic material into the mold 54 at a higher inflow rate and pressure to overcome the plastic material's unavoidably higher viscosity, the present invention uniquely reduces the inflow rate.

Specifically, it has been found that by maintaining the scrap-based plastic inflow rate to the mold 54 at a volumetric inflow rate not greater than an inflow rate FRmax less than the maximum acceptable mold inflow rate for essentially virgin cross-linkable plastic and inversely related to the ratio of the gel percent of the scrap-based plastic material to the gel percent of the essentially virgin cross-linkable plastic material, the same mold 54 may be used to economically form the plastic articles 10 from either essentially virgin cross-linkable plastic material or the previously described scrap-based cross-linkable plastic material.

For example, using the representative mold 54 with essentially virgin silane-grafted polyethylene having a gel percent GP of about 10 (point A on the FIG. 2 graph), the mold 54 may be utilized at its maximum plastic inflow rate of 17.3 cubic inches per second. When a scrap-based, partially cross-linked plastic material having a gel percent of 30.8 (point B on the FIG. 2 graph) is used in the mold 54 the mold inflow rate is maintained at or below a maximum inflow rate FRmax of about 16.7 cubic inches per second. As another example, when a scrap-based, partially cross-linked plastic material having a gel percent of 57.3 is used in the mold 54 the mold inflow rate is maintained at or below a maximum inflow rate FRmax of about 6.7 cubic inches per second.

The curve FRmax for a particular mold may be either empirically or theoretically developed. By using such curve as an upper plastic inflow rate limit for a mold (or other heat-based plastic formation apparatus such as an extruder), the articles 10 may be economically formed from cross-linkable plastic scrap without using a different mold or modifying the mold 54. While simple molding economics make it preferable to maintain the scrap-based plastic inflow rate close to the curve FRmax, subject to preventing the inflowing plastic from prematurely solidifying before accurate and complete molding takes place the plastic inflow rate can be somewhat reduced if desired.

The foregoing detailed description is to be clearly understood as being given by way of illustration and example only, the spirit and scope of the present invention being limited solely by the appended claims.

What is claimed is:

1. A method of manufacturing a plastic article comprising the steps of:

providing a quantity of cross-linked plastic scrap;

utilizing said quantity of cross-linked plastic scrap to form a scrap-containing plastic material having a gel percent greater than the gel percent of essentially virgin cross-linkable plastic material of the type from which said scrap was formed;

providing a heat-based plastic article forming apparatus into which plastic may be forcibly flowed, said plastic article forming apparatus, when utilized with said essentially virgin cross-linkable plastic material, having a first maximum acceptable plastic volumetric inflow rate; and flowing said scrap-containing plastic material into said plastic article forming apparatus at a volumetric inflow rate not greater than a second plastic volumetric inflow rate less than said first maximum acceptable plastic volumetric inflow rate and inversely related to the ratio of the gel percent of the scrap-containing plastic material to the gel percent of said essentially virgin cross-linkable plastic material.

2. The method of claim 1 wherein:

said step of providing a quantity of cross-linked plastic scrap is performed utilizing a quantity of cross-linked plastic scrap previously generated in the formation of plastic objects.

3. The method of claim 2 wherein:

said step of providing a quantity of cross-linked plastic scrap is performed utilizing a quantity of cross-linked plastic scrap previously generated in the heat-based formation of plastic objects.

4. The method of claim 3 wherein:

said step of providing a quantity of cross-linked plastic scrap is performed utilizing a quantity of cross-linked plastic scrap previously generated in the extrusion of plastic objects.

5. The method of claim 4 wherein:

said step of providing a plastic article forming apparatus is performed by providing a plastic mold.

6. The method of claim 1 wherein:

said step of providing a plastic article forming apparatus is performed by providing a plastic mold.

7. The method of claim 1 wherein:

said step of providing a quantity of cross-linked plastic scrap is performed utilizing a quantity of cross-linked polyethylene scrap.

8. The method of claim 1 wherein:

said utilizing step is performed by utilizing said quantity of cross-linked plastic scrap without an appreciable amount of essentially virgin cross-linkable plastic material mixed therewith.

9. The method of claim 1 wherein:

said utilizing step includes the step of combining a quantity of cross-linked plastic scrap and a quantity of essentially virgin cross-linkable plastic material.

10. A method of manufacturing a plastic article comprising the steps of:

providing a quantity of cross-linked polyethylene scrap generated in a heat-based plastic object forming process;

utilizing the scrap to form a cross-linked polyethylene material having a gel percent greater than the gel percent of an essentially virgin cross-linkable polyethylene material;

flowing the cross-linked polyethylene material into a plastic forming apparatus having, for said essentially virgin cross-linkable polyethylene material, a maximum acceptable volumetric inflow rate; and maintaining the volumetric inflow rate of said cross-linked polyethylene material into said plastic forming apparatus at a magnitude not greater than a second volumetric inflow rate less than said maximum acceptable volumetric inflow rate and inversely related to the ratio of the gel percent of the cross-linked polyethylene material to the gel percent of said essentially virgin cross-linkable polyethylene.

11. The method of claim 10 wherein:

said providing step is performed by providing a quantity of cross-linked polyethylene scrap generated in an extrusion process.

12. The method of claim 11 wherein:

said flowing step is performed by flowing the cross-linked polyethylene material into a plastic mold device.

13. The method of claim 10 wherein:

said flowing step is performed by flowing the cross-linked polyethylene material into a plastic mold device.

14. The method of claim 10 wherein:

said utilizing step is performed utilizing the scrap without an appreciable amount of said essentially virgin cross-linkable polyethylene material therein.

15. The method of claim 10 wherein:

said flowing step is performed utilizing a plastic forming apparatus configured to output a plastic piping product.

* * * * *